US008001279B2

(12) United States Patent  (10) Patent No.: US 8,001,279 B2
Berthaud et al.  (45) Date of Patent: Aug. 16, 2011

(54) METHOD OF SYNCHRONIZING FIREWALLS IN A COMMUNICATION SYSTEM BASED UPON A SERVER FARM

(75) Inventors: Jean-Marc Berthaud, Villeneuve Loubet (FR); Pascal Chauffour, Cagnes sur Mer (FR); Jean-Claude Dispensa, Saint Jeannet (FR); Valerie Mahe, Nice (FR)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 10/317,522

(22) Filed: Dec. 12, 2002

(65) Prior Publication Data

US 2003/0120816 A1    Jun. 26, 2003

(30) Foreign Application Priority Data

Dec. 21, 2001 (EP) .................................. 01480149

(51) Int. Cl.
*G06F 15/16* (2006.01)
(52) U.S. Cl. ........ 709/248; 709/249; 709/218; 709/229; 709/203; 726/5; 726/11; 726/121; 713/152; 370/349; 370/252; 370/401
(58) Field of Classification Search .................. 709/248, 709/249, 218, 229, 203; 726/11, 12, 15, 726/121, 5; 713/152; 370/349, 252, 401
See application file for complete search history.

(56) References Cited

U.S. PATENT DOCUMENTS

| | | | |
|---|---|---|---|
| 6,052,733 A * | 4/2000 | Mahalingam et al. ........ | 709/235 |
| 6,173,311 B1 | 1/2001 | Hassett et al. | |
| 6,182,139 B1 * | 1/2001 | Brendel ........................ | 709/226 |
| 6,397,260 B1 | 5/2002 | Wils et al. | |
| 6,550,012 B1 * | 4/2003 | Villa et al. ...................... | 726/11 |
| 6,556,547 B1 | 4/2003 | Srikanth et al. | |
| 6,763,479 B1 * | 7/2004 | Hebert .............................. | 714/4 |
| 6,885,633 B1 | 4/2005 | Mikkonen | |
| 6,901,517 B1 * | 5/2005 | Redmore ........................ | 726/11 |
| 7,231,462 B2 | 6/2007 | Berthaud et al. | |

(Continued)

FOREIGN PATENT DOCUMENTS

EP    1006702 A1    6/2000

(Continued)

OTHER PUBLICATIONS

Berthaud et al., U.S. Appl. No. 10/317,397, filed Dec. 12, 2002, Office Action Summary dated Apr. 6, 2006, 7 pages.

(Continued)

*Primary Examiner* — Thuong T Nguyen
(74) *Attorney, Agent, or Firm* — Hoffman Warnick LLC

(57) ABSTRACT

A method of synchronizing firewalls in a communication system comprising a server farm wherein any user connected to the Internet can access customer servers, and at least two firewalls using a Virtual Router Redundancy Protocol (VRRP) to set up as primary interface firewall the firewall which owns the primary interface of the VRRP group of interfaces to at least one customer server. The method includes initializing, in a secondary interface firewall, a synchronization message exchange with the primary firewall after receiving a packet for a connection having a state which is incompatible with the received packet or after the standard firewall processing of a packet corresponding to a new connection, and registering in a common connection table the state of any connection if the connection is new or if the connection state has changed.

12 Claims, 3 Drawing Sheets

U.S. PATENT DOCUMENTS

| | | | |
|---|---|---|---|
| 7,359,992 B2 | 4/2008 | Berthaud et al. | |
| 7,475,162 B2 | 1/2009 | Berthaud et al. | |
| 2002/0073337 A1* | 6/2002 | Ioele et al. | 713/201 |
| 2002/0133534 A1* | 9/2002 | Forslow | 709/200 |
| 2002/0145981 A1 | 10/2002 | Klinker et al. | |
| 2003/0018912 A1* | 1/2003 | Boyle et al. | 713/201 |
| 2003/0018914 A1* | 1/2003 | Cheng et al. | 713/201 |
| 2003/0035409 A1* | 2/2003 | Wang et al. | 370/349 |
| 2003/0120816 A1 | 6/2003 | Berthaud et al. | |
| 2003/0126268 A1 | 7/2003 | Berthaud et al. | |
| 2003/0131262 A1* | 7/2003 | Goddard | 713/201 |
| 2004/0010583 A1 | 1/2004 | Yu et al. | |
| 2005/0120082 A1* | 6/2005 | Hesselink et al. | 709/203 |

FOREIGN PATENT DOCUMENTS

| | | |
|---|---|---|
| EP | 1 035 708 A1 | 9/2000 |
| EP | 1035708 A1 | 9/2000 |

OTHER PUBLICATIONS

Berthaud et al., U.S. Appl. No. 10/317,397, filed Dec. 12, 2002, Office Action Summary dated Sep. 6, 2006, 6 pages.

Berthaud et al., U.S. Appl. No. 10/317,397, filed Dec. 12, 2002, Office Action Summary dated Feb. 23, 2007, 7 pages.

Berthaud et al., U.S. Appl. No. 10/317,397, filed Dec. 12, 2002, Office Action Summary dated Sep. 4, 2007, 13 pages.

Berthaud et al., U.S. Appl. No. 11/955,479, filed Dec. 13, 2007, Notice of Allowance and Fee(s) Due dated Sep. 2, 2008, 13 pages.

Berthaud et al., U.S. Appl. No. 10/317,652, filed Dec. 12, 2002, Office Action Summary dated Sep. 11, 2006, 10 pages.

Berthaud et al., U.S. Appl. No. 10/317,652, filed Dec. 12, 2002, Notice of Allowance and Fee(s) Due dated Feb. 9, 2007, 8 pages.

Knight et al., "Request for Comments (RFC) 2338: Virtual Router Redundance Protocol," Copyright the Internet Society, Apr. 1998, pp. 1-27.

* cited by examiner

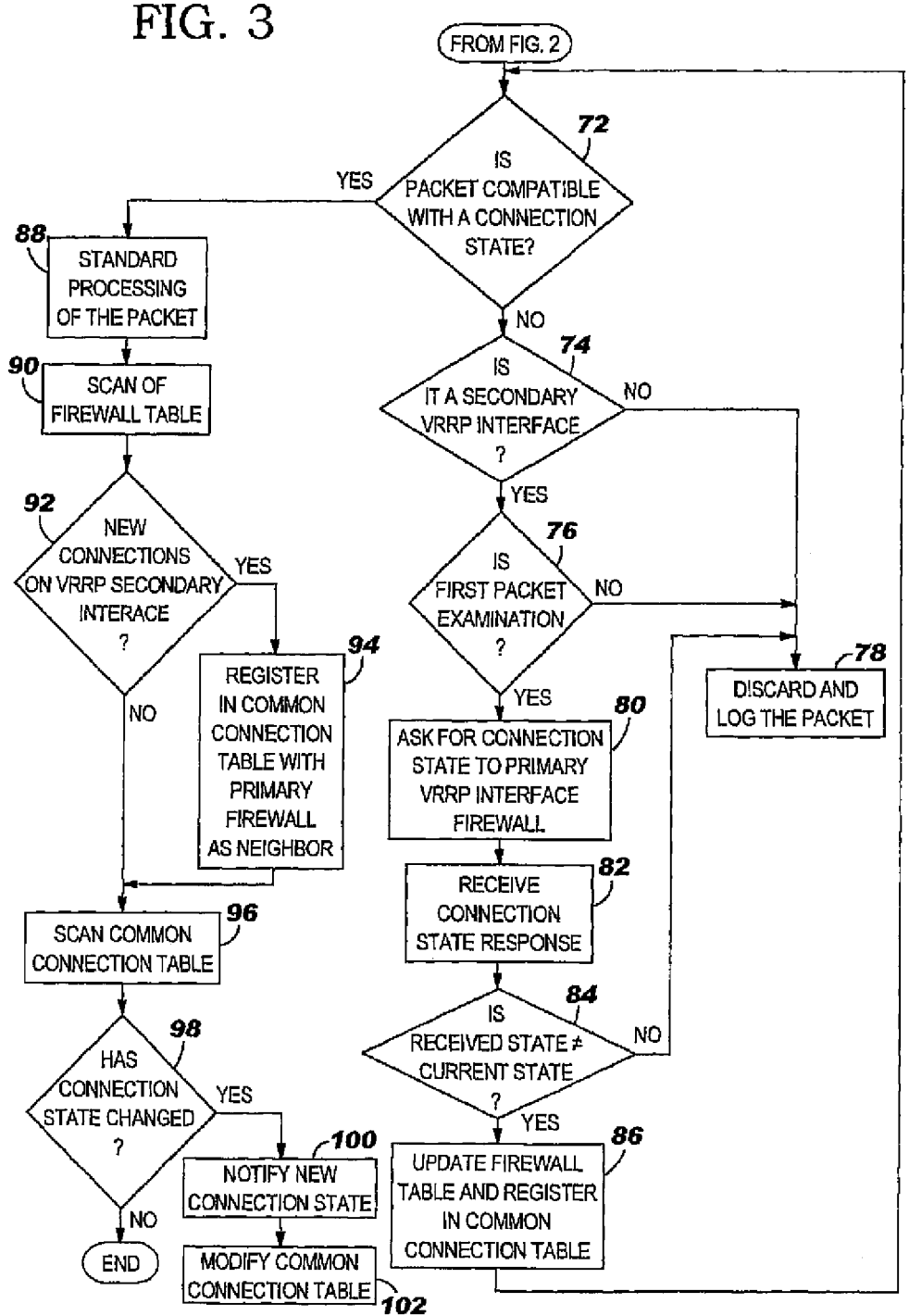

METHOD OF SYNCHRONIZING FIREWALLS IN A COMMUNICATION SYSTEM BASED UPON A SERVER FARM

TECHNICAL FIELD

The present invention relates to communication systems wherein customer cabinets containing customer WEB servers are hosted in a server farm connected to the Internet network and relates in particular to a method of synchronizing the firewalls in such a communication system.

BACKGROUND

A server farm is a physical location having a scalable infrastructure and facilities and resources enabling users connected to the Internet network to easily access a number of services provided by a plurality of customers hosted by the server farm. Generally, the resources are located in premises owned by a data processing equipment provider such as the IBM Corporation.

Most server farms are used today to host Internet related devices (for example WEB servers) of several customers. The architecture of such a server farm includes a local network to which are connected the customer cabinets and an Internet front-end connecting this local network to the Internet. Such a local network includes different layers of components such as switches and firewalls through which requests from the users connected to the Internet are routed towards the customer cabinets.

The firewalls are intermediary devices between the local Network and the front-end. They are connected by a LAN to an Internet Access Router (IAR) which may be directly connected to the Internet network. For redundancy, there are two firewalls connected to the IAR, a primary firewall and a secondary firewall. At a given time, all communications are established through the primary firewall. If the primary firewall fails, the secondary firewall becomes the primary firewall and all the communications pass through it.

The firewalls present all the characteristics of a router with the addition of security filtering features known as firewall rules. Firewalls also have the capability to inspect IP packets and track the state of sessions going through the firewall and established between any of two devices separated by this firewall. This overall process, which is known as "Statefull Inspection", includes checking that every backward connection is associated with an existing forward connection and in following the state of a connection to allow only packets that are in the right sequence level of the connection to proceed. This means that, if a connection is established from an end user to a WEB server (forward path) through a first firewall, all the responses coming from the WEB server to the end user (reverse path) will have to go through this firewall. If any firewall receives a reverse path frame without having received a forward path frame, it will drop the reverse path frame. If any firewall receives a data packet while the session is only at the connecting state, the firewall will drop the data packet.

In the local network, a protocol such as the Virtual Route Routing Protocol (VRRP) is used between the firewalls. VRRP allows the customer WEB servers to see the redundant firewalls as a single virtual firewall. At any instant, only one firewall really owns the virtual firewall function based on the availabilities of the firewall interfaces or on static priorities associated with them by configuration. The individual interface having the highest priority is the one elected to own the virtual firewall interface. The associated firewall acts as the virtual firewall until it fails or until another interface with a higher priority appears. A first firewall can own the virtual firewall function for a subset of the customer servers while the other firewall can own this role for another set of customers. In other words, this first firewall or primary interface firewall owns the primary interface of the VRRP group of interfaces to each one of these customer servers.

As at least two firewalls connect the local network to the Internet, each one of the customer WEB servers may be reached by at least two different paths going through each of the firewalls. Because of the Statefull Inspection mode in the firewalls, what is known as "symmetrical routing" is required, meaning that the forward path of a connection should be identical to the reverse path.

However, such a communication system has to meet two requirements. The first requirement is to allow different customer servers to communicate between themselves. This means that all customer servers should have the same primary interface firewall by configuration in order to provide symmetrical routing, all the customer servers being switched over the secondary interface firewall in case of firewall failure.

However, the second requirement is to allow the use of both firewalls at the same time rather than only one at a time, for better use of the resources and for higher availability. In view of the first requirement of symmetrical routing for the customer servers communicating together, the second requirement is not met insofar as two customer servers must use the same firewall at the same time to avoid the frames on the reverse path from being dropped.

SUMMARY

Accordingly, an object of the invention is to achieve a method of synchronizing the firewalls in a communication system based upon a server farm enabling several firewalls to be used for both paths of a connection despite the requirement of symmetrical routing.

The invention relates therefore to a method of synchronizing the firewalls in a communication system comprising a server farm connected to the Internet network by an Internet front-end including at least an Internet access router, the server farm comprising at least two customer cabinets with each customer cabinet including at least a WEB server and server farm resources enabling users connected to the Internet network to access the WEB servers in the customer cabinets, and at least two firewalls for controlling communication between users and one of the WEB servers. The firewalls employ a Virtual Router Redundancy Protocol (VRRP) or the like to set up as primary interface firewall the firewall which owns the primary interface of the VRRP group of interfaces to at least one customer cabinet and through which is established communication between an Internet user and the customer cabinet. The method comprises the steps of initializing, in a firewall which is not the primary interface firewall (called a secondary interface firewall), a synchronization message exchange with the primary interface firewall after receiving a packet for a connection the state of which is not compatible with the received packet or after the standard firewall processing of a packet corresponding to a new connection has been completed, and registering in a connection table common to a plurality of firewalls the state of any connection if the connection is new or if the connection state has changed, further to updating the firewall table in the secondary interface firewall.

BRIEF DESCRIPTION OF THE DRAWINGS

The above and other objects, features and advantages of the invention will be better understood by reading the following more particular description of the invention in conjunction with the accompanying drawings wherein:

FIG. 3 is a flow chart representing the steps of processing a data packet in the method according to the invention.

DETAILED DESCRIPTION

Figure 1:
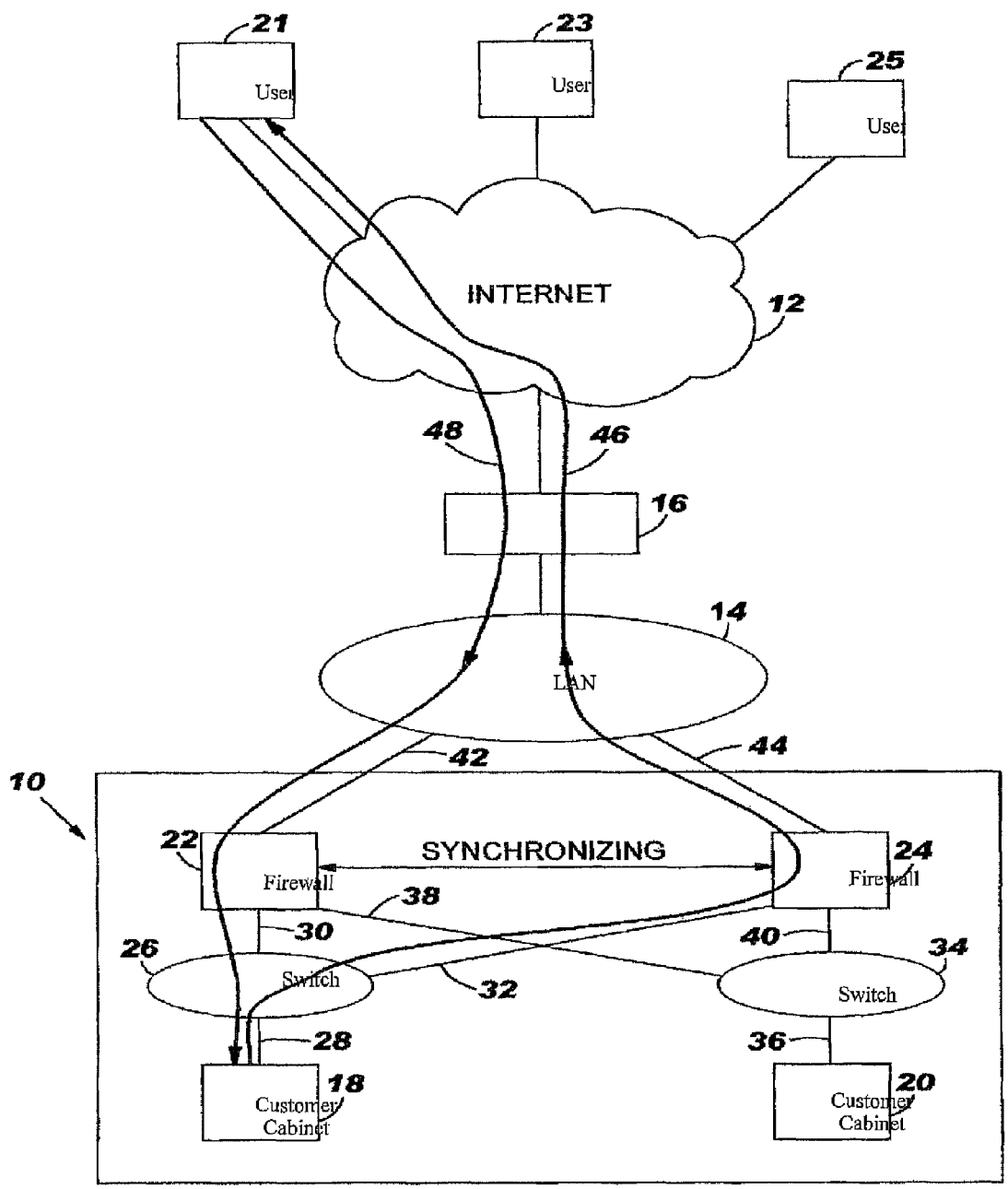
FIG. 1 is a schematic block-diagram representing a server farm wherein the invention can be implemented.

The method according to the invention may be implemented in the context illustrated in FIG. 1 wherein a server farm 10 is connected to the Internet network 12 (or any other Intranet network) by the intermediary of a LAN 14 and an Internet Access Router (IAR) 16. Several customer cabinets such as cabinets 18 and 20 are hosted in server farm 10, each cabinet including one or several customer WEB servers. Each customer cabinet is connected to at least two firewalls 22 and 24 by the intermediary of switches. Thus, customer cabinet 18 is physically connected to a switch 26 by a link 28, the switch 26 being physically connected to firewall 22 by a link 30 and to firewall 24 by a link 32. Likewise, customer cabinet 20 is physically connected to a switch 34 by a link 36, the switch 34 being physically connected to firewall 22 by a link 38 and to firewall 24 by a link 40. Finally, firewalls 22 and 24 are physically connected to LAN 14 by respectively links 42 and 44. Note that a plurality of users such as users 21, 23 and 25 can send requests to the customer WEB servers of each cabinet 18 or 20.

In the communication system illustrated in FIG. 1, the customer servers included in cabinets 18 and 20 may be reached by two different paths going through each of the firewalls 22 and 24. Thus, cabinet 18 can be reached from the LAN 14 through links 42, 30 and 28 or through links 44, 32 and 28. But, without the method according to the invention and because of the Statefull Inspection mode in the firewalls, the forward path should be identical to the reverse path in order to provide symmetrical routing.

A goal of the invention is therefore to eliminate the symmetrical routing requirement by exploiting the fact that there are few connection states seen by a firewall for common protocols and, accordingly, only a few synchronization exchanges are needed to maintain synchronized states between the firewalls, in a way that minimizes delay in the packet processing time. The solution is applicable to VRRP communities comprising two or more firewalls. Note that the synchronization between firewalls runs in addition to the regular full table exchange that happens between firewalls, which is used to remedy a firewall failure.

The solution may be illustrated by considering examples of protocols which are mostly used in the web hosting domain in relation with the possible states of a connection shown in the following table:

| State | State # | Allowed |
|---|---|---|
| Does not exist (applies to all connection schemes) | 0 (default) | Only connection initiation packets allowed |
| Init 1 - Init request | 1 | Only answers to initiation packets allowed, from recipient of init request |
| Init 2 - Init response | 2 | Only connection confirmation packet |

-continued

| State | State # | Allowed |
|---|---|---|
| Exist | 3 | allowed, from initiation requester All data packets allowed |

Connection-less schemes like UDP are always in state 0

Simple connection schemes like SNMP are at state 0 by default, go to state 1 upon request, and go back to state 0 at the end of a response.

Reliable connection schemes like TCP or session based protocols are at state 0 by default, go to state 1 upon request, go to state 2 upon answer to request from recipient, and then go to state 3 upon requester final connection acknowledge packet or requester first data packet. Any time-out mechanism can also be incorporated to return to state 0.

Figure 2:
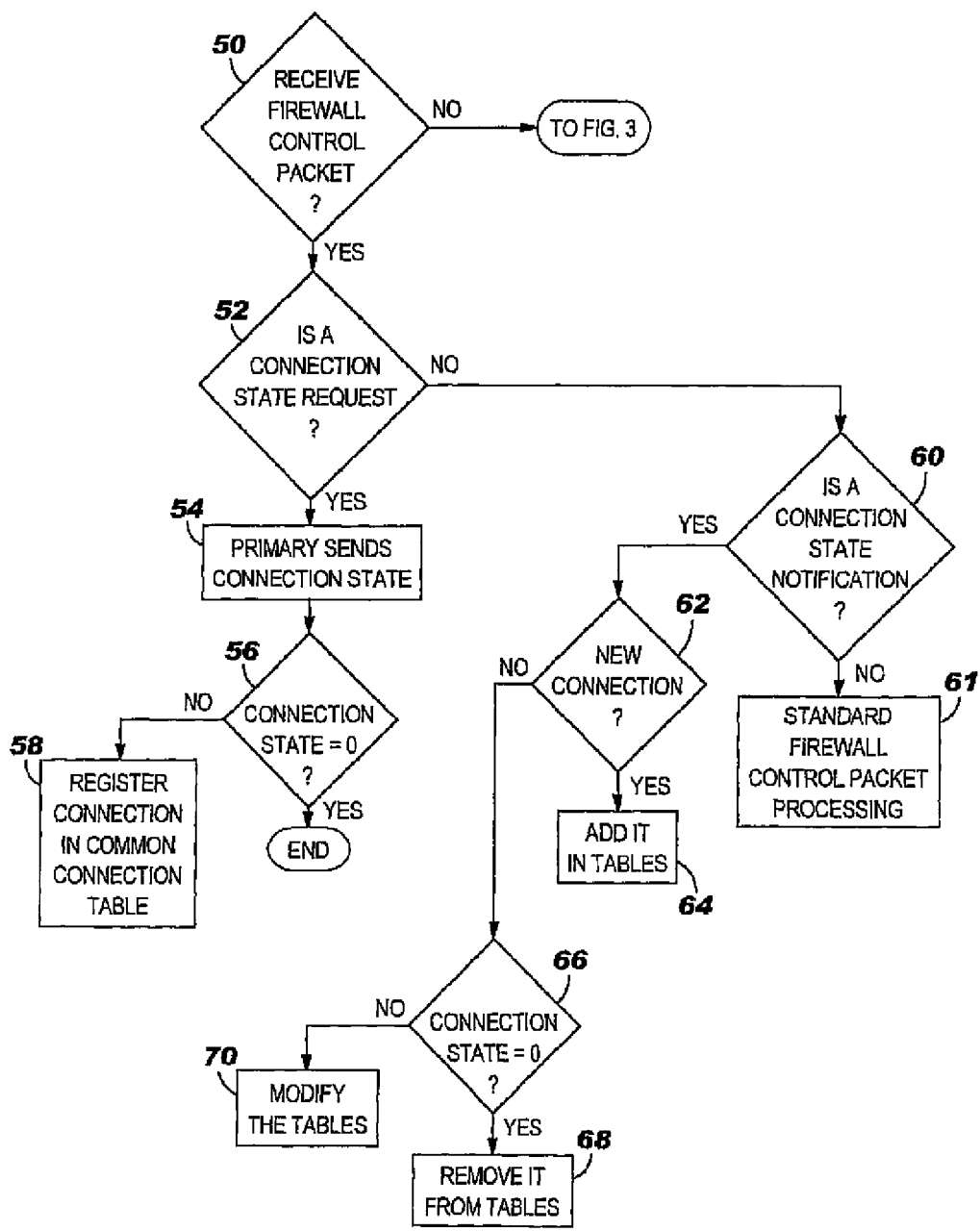
FIG. 2 is a flow chart representing the steps of processing a firewall control packet in the method according to the invention.

The method according to the invention is now described in reference to FIG. 2 and FIG. 3. Each packet received by a firewall is examined to determine whether it is a control packet destined to this firewall (step 50). If not, the packet is a normal traffic packet going through the firewall, the processing of which is described in FIG. 3. If so, the packet is further examined to determine its type.

It is then determined whether the packet is a connection state request packet (step 52). If so, it has been sent by a neighbor firewall with an interface that is secondary VRRP in the same VRRP group as an interface of this firewall being primary VRRP. The primary VRRP interface firewall sends back a connection state response packet to the secondary VRRP firewall with the state of the connection which is known by this firewall (step 54).

It is then checked whether the connection state is different from 0 or not (step 56). If so, meaning that the connection exists and is known by the firewall, this connection is registered (step 58) in a common connection table, maintained in firewalls 22 and 24 in the example illustrated in FIG. 1. The data being registered are the connection state and the requesting firewall as neighbor. If the connection state is 0, i.e. it does not exist, the processing is ended.

If the packet is not a connection state request packet, the following step checks whether it is a connection state notification packet (step 60). If not, the packet is processed according to the standard firewall process (step 61). If it is a connection state notification, a determination is made whether the connection is new or not (step 62). If it is a new connection, this new connection is registered (step 64) in the common connection table with the notified state and with the notifying firewall as neighbor. The firewall table (registering the connections through the firewall) is updated by adding the connection set to the notified state.

If the connection is not new but already known in the common connection table, it is determined whether the notified connection state is 0. If so, meaning that the connection has ceased to exist, the connection is removed from the common connection table and from the firewall table (step 68). Else, it is necessary to update the tables (step 70) by modifying the common connection table related to this connection and with the notifying firewall as neighbor, setting its state to the notified state and setting the state of this connection in the firewall table to the notified state.

If the packet being received by a firewall is not a control packet destined to this firewall, it is handed over to the standard traffic packet processing represented in FIG. 3. This flow chart is entered whenever the packet received by the firewall is a packet destined to another device. It relates to a connection between two devices talking to each other with this firewall in the data path.

The packet is first examined by the standard firewall stateful inspection and it is checked whether the packet is compatible with a connection state (step 72). If the packet is not compatible, i.e. The packet is not allowed/expected by the current state of the connection, it is then checked whether the packet is going through any secondary VRRP interface to enter or exit the firewall (step 74). If so, it is also checked whether this is the first examination of the packet (step 76). If the packet is not going through a secondary VRRP interface or it is not the first examination, the packet is handed over to the standard firewall discard and log process (step 78).

If the packet is going through a secondary VRRP interface of the firewall and this is the first time the packet is examined, a connection state request packet for this connection is sent to the firewall owning the primary VRRP interface in the VRRP group of the secondary VRRP interface (step 80). When the corresponding connection state is received (step 82), it is checked whether the received state is different from the local state for this connection in the firewall table (step 84). If not, the packet is handed over to the standard discard and log process (step 78). If the received state is different from the state of the connection in the firewall table, the connection state is updated in the firewall table with this new state and the connection is registered in the common connection table with the new state and with the primary VRRP interface firewall as neighbor (step 86). Then, the process is returned to the standard firewall stateful inspection for a second examination of the packet with the new connection state.

If, following the stateful inspection and upon a first or a second examination, it is determined that the packet is compatible with the current connection state in the firewall table, the standard firewall processing is applied to the packet (step 88). At the end of the standard processing, a scan of the firewall table is made (step 90) in order to determine whether there are new connections going through a secondary VRRP interface created in the table due to the processing by the firewall of this packet (step 92). If there are, the new connections are registered (step 94) in the common connection table with the primary VRRP interface firewall as neighbor and with a state set to 0 to trigger a notification to the primary VRRP interface firewall in the next steps 96, 98 and 100.

Then, a scan of the common connection table is made (step 96) in order to determine whether the state has changed (step 98) due to the standard packet processing or whether new connections have been created. If not, the process is ended. If there are such connections, a connection state notification packet is sent for each of these connections (step 100) with the new state from the firewall table as the notified state to the neighbor firewall. Finally, the connection state of these connections is modified in the common connection table to reflect this new state (step 102). Of course, if the new state is 0, the connection is removed from the common connection table as already mentioned.

The above method avoids lingering of connections in connection state tables, and achieves optimal delays in packet processing and in the number of exchanged messages. The number of synchronization messages in a connection life is very few, at most between 2 and 3 for a simple connection scheme and between 4 and 5 for a reliable connection scheme. The impact of the method on the processing time of the packets is negligible on the firewall whose interface is primary VRRP for the customer packet and reduced to a minimum on the other firewall.

We claim:

1. A method of synchronizing firewalls in a communication system; said method comprising steps of:
   a) determining, upon receiving a packet for a connection at a secondary interface firewall, whether a connection state of the received packet is incompatible with an expected state based on a current state of the connection on the secondary interface firewall;
   b) determining, upon receiving the packet at the secondary interface firewall whether the packet corresponds to a new connection for which standard firewall processing has been completed by a firewall other than the secondary interface firewall;
   c) in response to a determination that the packet corresponds to a new connection or that the state of the received packet is incompatible, initializing, in the secondary interface firewall, a synchronization message exchange specific to the received packet with a primary interface firewall to retrieve from the primary interface firewall state information necessary for the secondary interface firewall to process the packet, and
   d) in response to the received packet, registering by the primary interface firewall a connection state in a common connection table maintained by the primary interface firewall that said connection goes through only if said connection is new or if said connection state has changed, the registering enabling any firewall in a firewall community that includes the primary interface firewall and the secondary interface firewall to process a subsequent packet received for the connection,
   wherein the communication system comprises a server farm connected to an Internet network by an Internet front-end including at least an Internet access router, said server farm comprising at least two customer cabinets with each customer cabinet including at least a WEB server and server farm resources enabling users connected to the Internet network to access the WEB servers in said customer cabinets, and at least two firewalls for controlling communication between users and one of said WEB servers, said firewalls using a Virtual Router Redundancy Protocol (VRRP) to set up as the primary interface firewall a firewall which owns the primary interface of the VRRP group of interfaces to at least one customer cabinet,
   wherein the synchronizing allows the primary interface firewall and the secondary interface firewall to control the communication concurrently.

2. The method according to claim 1, wherein the step of initializing includes, based on said secondary interface firewall having received a packet for a connection the state of which is incompatible with said received packet, the steps of: requesting, from said secondary interface, for the state of said connection to the primary interface firewall, and sending, from said primary interface firewall, a response message indicating the state of said incompatible connection to any other secondary interface firewall.

3. The method according to claim 2, wherein said step of registering includes for any secondary interface firewall, after receiving a response message indicating the state of said incompatible connection, the steps of: registering in its common connection table the new state of of said connection with said primary interface firewall as neighbor, and setting the state of said connection in its firewall table to said new state.

4. The method according to claim 3, wherein if the packet for which the connection state sent back by said primary interface firewall is the same as the local state for this connection in its firewall table, the packet is handed over to a firewall discard and log process.

5. The method according to claim 2, wherein said connection is removed from said common connection table and from said firewall table when the state of said connection sent by said primary interface firewall is a default state.

6. The method according to claim 3, wherein the current state of said connection is registered in the common connection table of said primary interface firewall with said secondary interface firewall as neighbor after receiving the request from said secondary interface firewall.

7. The method according to claim 1, wherein said step of initializing includes when said secondary interface firewall has received a packet after standard firewall processing of a packet corresponding to a new connection has been completed, a step of notifying from said secondary interface firewall the state of said new connection to said primary interface firewall.

8. The method according to claim 7, wherein said step of registering includes, for said primary interface firewall, the steps of: registering in its common connection table the notified state of said connection with said secondary interface firewall as neighbor, and adding the connection set to said notified state to its firewall table.

9. The method according to claim 1, wherein a connection state notification is forwarded from any firewall to its neighbor firewalls whenever the state of a connection in said common connection table has changed after standard firewall processing of the packet in said firewall.

10. The method of claim 1, wherein the synchronization message exchange is in addition to a full table exchange and uses storage that is different from storage used to remedy failure of a firewall.

11. A computer program product stored on a computer readable storage device for synchronizing the firewalls in a communication system, which, when executed by a computer, implements the method comprising:
   a) determining, upon receiving a packet for a connection at a secondary interface firewall, whether a connection state of the received packet is incompatible with an expected state based on a current state of the connection on the secondary interface firewall;
   b) determining, upon receiving the packet at the secondary interface firewall whether the packet corresponds to a new connection for which standard firewall processing has been completed by a firewall other than the secondary interface firewall;
   c) in response to a determination that the packet corresponds to a new connection or that the state of the received packet is incompatible, initializing, in the secondary interface firewall, a synchronization message exchange specific to the received packet with a primary interface firewall to retrieve from the primary interface firewall state information necessary for the secondary interface firewall to process the packet, and
   d) in response to the received packet, registering by the primary interface firewall a connection state in a common connection table maintained by the primary interface firewall that said connection goes through only if said connection is new or if said connection state has changed, the registering enabling any firewall in a firewall community that includes the primary interface firewall and the secondary interface firewall to process a subsequent packet received for the connection,
   wherein the communication system comprises a server farm connected to an Internet network by an Internet front-end including at least an Internet access router, said server farm comprising at least two customer cabinets with each customer cabinet including at least a WEB server and server farm resources enabling users connected to the Internet network to access the WEB servers in said customer cabinets, and at least two firewalls for controlling communication between users and one of said WEB servers, said firewalls using a Virtual Router Redundancy Protocol (VRRP) to set up as the primary interface firewall a firewall which owns the primary interface of the VRRP group of interfaces to at least one customer cabinet,
   wherein the synchronizing allows the primary interface firewall and the secondary interface firewall to control the communication concurrently.

12. A communication system comprising a server farm which is connected to the Internet network by an Internet front-end including at least an Internet access router, said server farm comprising at least two customer cabinets with each customer cabinet including at least a WEB server and server farm resources enabling user connected to the Internet to access the WEB servers in said customer cabinets, and at least two firewalls for controlling communication communication between users and one of said WEB servers, said firewalls using a Virtual Router Redundancy Protocol (VRRP) to setup one of said firewalls as primary firewall through which is established communication between an Internet user and one of said customer cabinets, wherein each one of said firewalls is provided with a computer program product stored on a computer readable storage device for synchronizing the firewalls in a communication system, which, when executed by a computer, implements the method comprising:
   a) determining, upon receiving a packet for a connection at a secondary interface firewall, whether a connection state of the received packet is incompatible with an expected state based on a current state of the connection on the secondary interface firewall;
   b) determining, upon receiving the packet at the secondary interface firewall whether the packet corresponds to a new connection for which standard firewall processing has been completed by a firewall other than the secondary interface firewall;
   c) in response to a determination that the packet corresponds to a new connection or that the state of the received packet is incompatible, initializing, in the secondary interface firewall, a synchronization message exchange specific to the received packet with a primary interface firewall to retrieve from the primary interface firewall state information necessary for the secondary interface firewall to process the packet, and
   d) in response to the received packet, registering by the primary interface firewall a connection state in a common connection table maintained by the primary interface firewall that said connection goes through only if said connection is new or if said connection state has changed, the registering enabling any firewall in a firewall community that includes the primary interface firewall and the secondary interface firewall to process a subsequent packet received for the connection, wherein the communication system comprises a server farm connected to an Internet network by an Internet front-end including at least an Internet access router, said server farm comprising at least two customer cabinets with each customer cabinet including at least a WEB server and server farm resources enabling users connected to the Internet network to access the WEB servers in said customer cabinets, and at least two firewalls for controlling communication between users and one of said WEB servers, said firewalls using a Virtual Router Redundancy Protocol (VRRP) to set up as the primary interface firewall a firewall which owns the primary interface of the VRRP group of interfaces to at least one customer cabinet, wherein the synchronizing allows the primary interface firewall and the secondary interface firewall to control the communication concurrently.

* * * * *